United States Patent [19]

Yoshida et al.

[11] Patent Number: 5,426,580

[45] Date of Patent: Jun. 20, 1995

[54] TIME CHANGEABLE DEVICE FOR AN AUTOMATIC BAKING MACHINE

[75] Inventors: Shinji Yoshida; Yoshikatsu Okamoto, both of Daito, Japan

[73] Assignee: Funai Electric Co., Ltd., Daito, Japan

[21] Appl. No.: 67,826

[22] Filed: May 25, 1993

[30] Foreign Application Priority Data

| May 25, 1992 | [JP] | Japan | 4-158742 |
| Jul. 10, 1992 | [JP] | Japan | 4-207221 |
| Mar. 24, 1993 | [JP] | Japan | 5-089206 |

[51] Int. Cl.$^6$ .............................................. G05B 11/01
[52] U.S. Cl. ........................................... 364/143; 99/327; 99/332; 99/348
[58] Field of Search ............... 364/143, 477, 400, 146, 364/188, -, 192, 557, 183; 99/327, 332, 348, 468; 366/98, 146, 601; 219/492

[56] References Cited

U.S. PATENT DOCUMENTS

| 3,912,913 | 10/1975 | Bunting | 364/183 |
| 4,437,159 | 3/1984 | Waugh | 364/400 |
| 4,613,739 | 9/1986 | Richards | 364/400 |
| 4,636,949 | 1/1987 | Longabaugh | 364/400 |
| 4,914,277 | 4/1990 | Guerin et al. | 364/477 |
| 4,984,512 | 1/1991 | Takahashi et al. | 364/143 |

*Primary Examiner*—James P. Trammell
*Attorney, Agent, or Firm*—Lackenbach Siegel Marzullo Aronson & Greenspan

[57] ABSTRACT

A process-controlling device enables the prevention of process deviation from preset standardized operations and the occurrence of abnormal effects, even if the baking machine is accidentally started without setting up the processing time. The process-controlling device alters the preset processing times by inputting external input data, performing successively each step of the process in accordance with each of the altered processing times allocated to each step of the preset process. A time data-inputting device for inputting time data equivalent to the difference between each of the preset processing times and each processing time to be altered, and a processing time-altering device for increasing or decreasing the time data against the preset processing time and altering the preset processing time to the new processing time.

3 Claims, 16 Drawing Sheets

FIG. 4

| | FIRST AGITATING | PAUSE | SECOND AGITATING | FMERMENTING | ROUNDING | SHAPING |
|---|---|---|---|---|---|---|
| A LOAF OF BREAD | PRESET TIME | PRESET TIME | PRESET TIME | PRESET TIME | PRESET TIME | PRESET TIME |
| FRENCH BREAD | PRESET TIME | PRESET TIME | PRESET TIME | PRESET TIME | PRESET TIME | PRESET TIME |
| SWEET BREAD | PRESET TIME | PRESET TIME | PRESET TIME | PRESET TIME | PRESET TIME | PRESET TIME |
| MIXING | REQUIRED TO INPUT NEW TIME (OR AS PRESET) | — | — | — | — | — |
| PROGRAM | REQUIRED TO INPUT (NEW TIME) | REQUIRED TO INPUT (NEW TIME) | REQUIRED TO INPUT (NEW TIME) | REQUIRED TO INPUT (NEW TIME) | REQUIRED TO INPUT (NEW TIME) | REQUIRED TO INPUT (NEW TIME) |

TIME CHANGEABLE DEVICE FOR AN AUTOMATIC BAKING MACHINE

BACKGROUND OF THE INVENTION

This invention relates to a process-controlling device of a bread baking machine enabling easy alteration of the processing time for each step of the bread baking process.

An example of a process-controlling device for baking bread is disclosed in a bread-baking machine in Utility Model Application No. Heisei 1 (1989)-108232.

A plan view of the control panel of the said baking machine, the internal structure of the baking machine, an electrical circuit of the controlling device of the baking machine and a time chart of each step of the baking process are shown in FIG. 13 to FIG. 16.

In FIG. 13, the controlling panel 52 is shown, and installed in the panel 52 is a menu switch 53 for selecting the desired type of bread such as bread loaves, French bread, sweet breads or the like;

reservation switches 54, 55 for setting the baking time of the bread;

a reset switch 56 for channeling the reservations;

a starting switch 57 for starting the bread-baking process;

a display 58 for displaying the elapsed processing time or the present time;

a dial 59 for setting the baking results of the bread and the like.

Displaying lamps 60 installed above the controlling panel 52 display the kind of bread selected by the menu switch 53 and the ending of the process.

In FIG. 14, the internal construction of the conventional bread-baking machine is shown. Also in FIG. 14, the legs 61 of the bread-baking machine 61, an openable cover lid 63, an inner frame 64, a bearing plate 65, an internal case 66, an oven heater 67, a bread baking case 68, a pair of engaging segments 70 for fixing the bread-baking case to a base plate 71 are metal 73, an upper rotating shaft 74, an agitating motor 75, a driving belt 76, a pair of pulleys 77 and 78, an output shaft 79 of the agitating motor 75, a bottom rotating shaft 80, clutch plates 81 and 82, an agitating blade 83, a glass window 84, a heat reflecting plate 85, an air supply guide 86, an air suction port 87, an air-delivering guide 88, an air fan 89, an air back-flow protection plate 90, a dough sensor 91, a heat isolator 92, an oven sensor 93 installed on the inner case 66, and an air-feeding motor 94 are also installed in the baking machine.

A circuit diagram of the baking machine controller is shown in FIG. 15.

In FIG. 15, the parts that are the same or equivalent to the ones shown in FIG. 13 and FIG. 14 are identified with the same reference numbers. Also provided in FIG. 15 are a change-over switch 101 for switching the dough sensor 91 to the oven sensor 93, an integrator 102, a comparator 103, a thermostat 104, a voltage-checking circuit 105, a timer 106 for preventing abrupt disconnections, and a microcomputer 107. The microcomputer 107 has a RAM, a ROM, I/O ports and an A/D converter. Also in said ROM, standard programs for baking the bread and other necessary data are recorded. Further provided in the circuit shown in FIG. 15 are a transformer 108 for feeding back the heater current of the oven heater 67, a relay circuit 109 for turning the heater current of the oven heater 67 on or off, a triac 110 for controlling the heater current of the oven heater 67, an amplifying circuit 111, a speaker 112 for issuing an alarm, a relay circuit 113 for controlling the air feeding motor 94 and a relay circuit 114 for controlling the agitating motor 74.

Further, in FIG. 16 the time chart of the working process of said conventional baking machine is shown. In the baking machine, it is possible to bake bread according to the successive processing steps such as agitating, fermenting, forming and baking, after said bread dough is placed in the bread baking case 68.

In such baking machine it is also possible to bake the desired type of bread by externally regulating the menu switch 53 and the reservation switches 54 and 55 for selecting the kind of bread to be baked, and for setting the baking time of the bread to be baked, and by setting up each present processing time of each process step in the time chart shown in FIG. 16.

With reference to the processing time altering method adopted in the conventional baking machine, the processing time to be altered among the preset standard processing times is displayed on said displayer 58, then the displayed processing time (for example, 5 minutes) is exchanged with the new processing time (for example, 6 minutes) by operating the menu switch 53 and said reservation switches 54, 55 and thereafter the exchanged new processing time is applied.

However, in the process-controlling device provided in the conventional baking machine, when setting up the preset processing time, if the baking machine is accidentally started as leaving the processing time is not set up, because initial values are not input, disappears from the time chart shown in FIG. 16, which results in the dough or bread not being properly produced by said baking process which lacks the processing step.

The present invention was developed in consideration of the above-mentioned drawbacks, and its object is to provide a process-controlling device which prevents abnormal results by keeping the processing step in standard preset working condition even if the baking machine is accidentally started as leaving just the processing time is not set up.

Also, in said process-controlling device adopted in the conventional baking machine, when a specified process in the baking course is selected (for example, a loaf of bread is selected from said menu), the baking process is set up according to the preset processing time, such as a first agitating step (20 minutes), a resting step (45 minutes), a secondary agitating step (30 minutes), a fermenting step (30 minutes), a rounding step (8 seconds), and a forming step (40 minutes). Accordingly, as the processing time for each step is always kept at the preset constant standard time, for example, in the baking process for a loaf of bread, dough of the same quality is always produced, making it impossible to obtain dough having the user's preferred hardness and stickiness.

The present invention was developed in consideration of the above-mentioned drawbacks, and the object of the present invention is to provide a process-controlling device in which the processing time for processing each step of the baking process may be easily and randomly selected, automatically producing dough of many different qualities.

Furthermore, in the conventional baking machine, after the miscellaneous switches 53–55 and said dial 59 were set for regulating the baking condition, it was impossible to observe the working conditions and the progress of the baking process until the process was completed. The user was obliged to follow the baking process only by watching the positions of the switching buttons or adjusting grips.

Therefore, the present invention was developed considering the further drawbacks mentioned above, and the object of the present invention is to provide a bread-baking machine having a display which shows the respective processing steps and working conditions and newly set-up conditions, by providing a function indicating each of the working conditions and set-up conditions for the processing steps. Still other objects and advantages of the present invention will be apparent from the following specification.

SUMMARY OF THE INVENTION

The present invention is a baking process-controlling device for altering any of the processing steps that successively carry out said baking process, in accordance with externally input data, and is characterized in being provided with process step altering means enabling each of said steps to be altered by said externally input specified data.

Therefore, said preset baking process steps are changed to the best process steps by inputting specified data from said process step changing means, and said baking process is controlled in the best condition by said process-controlling device.

In said process-controlling device according to the present invention there are provided a processing time data inputting means for inputting the different processing times corresponding to the difference between said preset standard processing time and user's preferred processing time corresponding to each of said process steps, and a processing time varying means for adding or reducing said processing time difference to said preset standard processing time.

Accordingly, said process controlling device is characterized in that said processing time difference input by said processing time data inputting means is changed to a new processing time for carrying out said baking process by said processing time varying means, and said process controlling device carries out said bread-baking process under the best conditions.

In said process-controlling device, as said preset processing time is altered to said new processing time with reference to said processing time difference, when setting said new processing time, even if zero is input, said new processing time is not set at zero, and said baking process is carried out according to said originally preset standard processing time, and said aforementioned abnormal results in baking are prevented.

Further, said process-controlling device according to the present invention is characterized in being provided with:

a menu inputting means for randomly selecting the desired type of bread;

a processing time setting means for requesting the processing time in order to produce said bread selected by said menu inputting means, from the memory which is preset and pre-input with said processing time; and a controlling portion for successively carrying out said preset process steps according to said processing times set by said processing time setting means.

Furthermore, as said controlling portion performs said baking process steps successively in accordance with said bread types input into said menu inputting means, preset processing steps and said new processing time read out from said memory, it is possible to securely and automatically obtain the desired type of dough.

Also, in said baking machine which bakes said breads through miscellaneous process steps such as agitating, fermenting, shaping, baking and the like, from the dough placed into said baking case, said process-controlling means according to the present invention is characterized in having:

a setting means for setting each of said baking process steps;

a controlling means for controlling said baking process steps in accordance with the operations of said setting means; and at least one displaying means which displays said process steps, baking conditions, and set functions.

In the present invention, said process steps, such as agitating, fermenting, shaping, baking and the like are displayed by said displaying means according to the display signals from said controlling means, and said working conditions and the amount of time elapsed in each of said process steps are displayed by said working condition display, and the baking conditions, such as light, medium, dark and the like, are also displayed by set function display.

BRIEF DESCRIPTION OF THE DRAWINGS

The object and features of the present invention, as well as the presently preferred embodiments thereof, will become more readily apparent from the following detailed description taken in conjunction with the accompanying drawings in which:

FIG. 4 is an explanatory diagram showing detailed contents of the menu data stored in the memory shown in FIG. 3;

FIG. 12(*b*) is a flow chart for displaying the baking process step;

FIG. 12(*c*) is a flow chart for displaying the process progress;

DETAILED DESCRIPTION OF THE INVENTION

Three preferred embodiments according to the present invention are described practically and in detail with reference to the related drawings as follows.

FIRST EMBODIMENT

First, the first embodiment according to the present invention is described. As the construction of the operating panel and the internal construction of a bread-baking machine applying the first embodiment are the same as in the conventional bread-baking machine shown in FIG. 13 and FIG. 14, the detailed disclosures of said operating panel and the internal construction of the bread-baking machine according to the first embodiment are eliminated, and are referred to in FIG. 13 and FIG. 14 when required.

Figure 1:
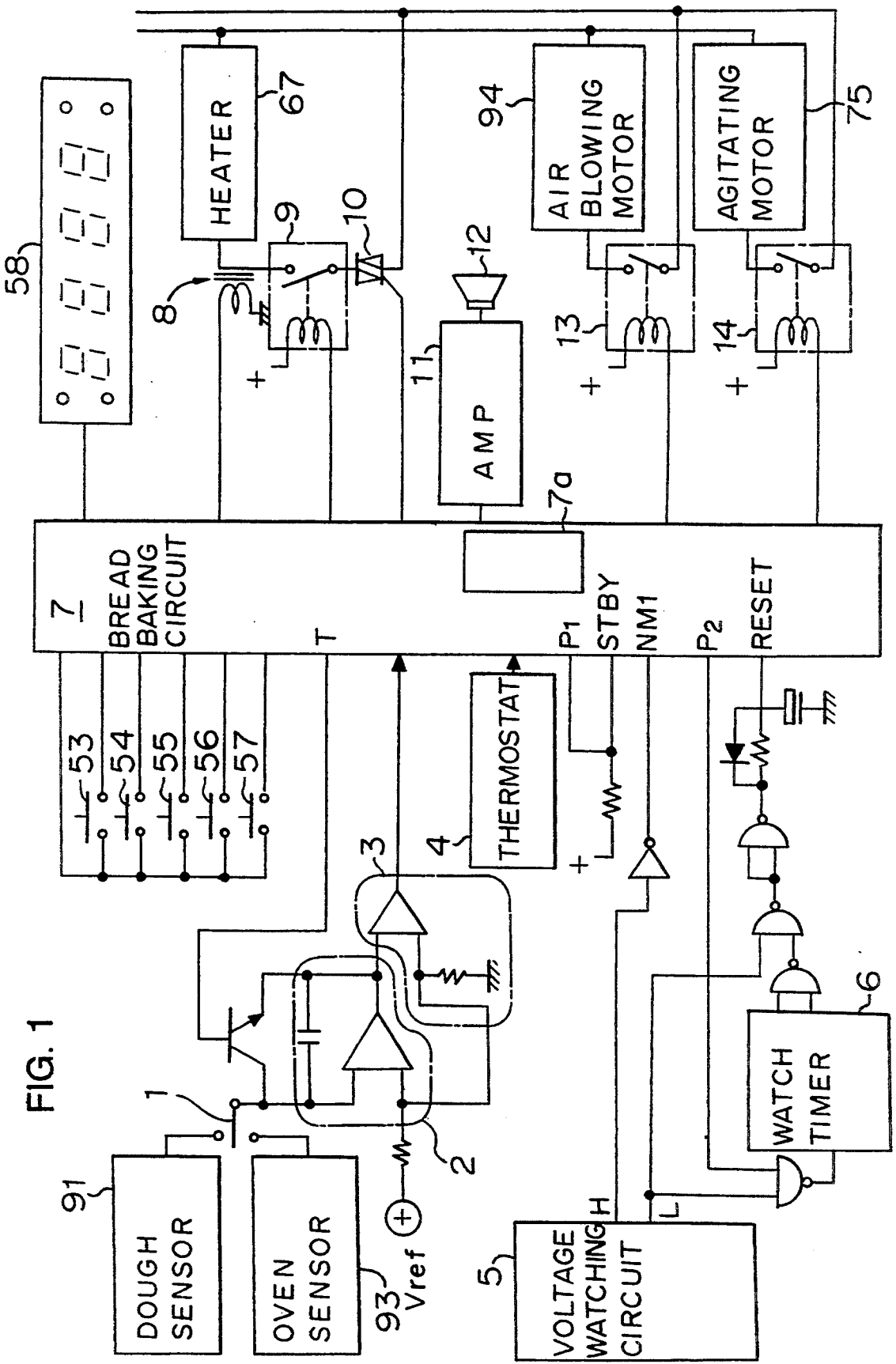
FIG. 1 is an electrical circuit of the first embodiment of the bread-baking machine according to the present invention.

The electrical circuit of the process-controlling device employed in the first embodiment according to this invention is shown in FIG. 1.

Figure 13:
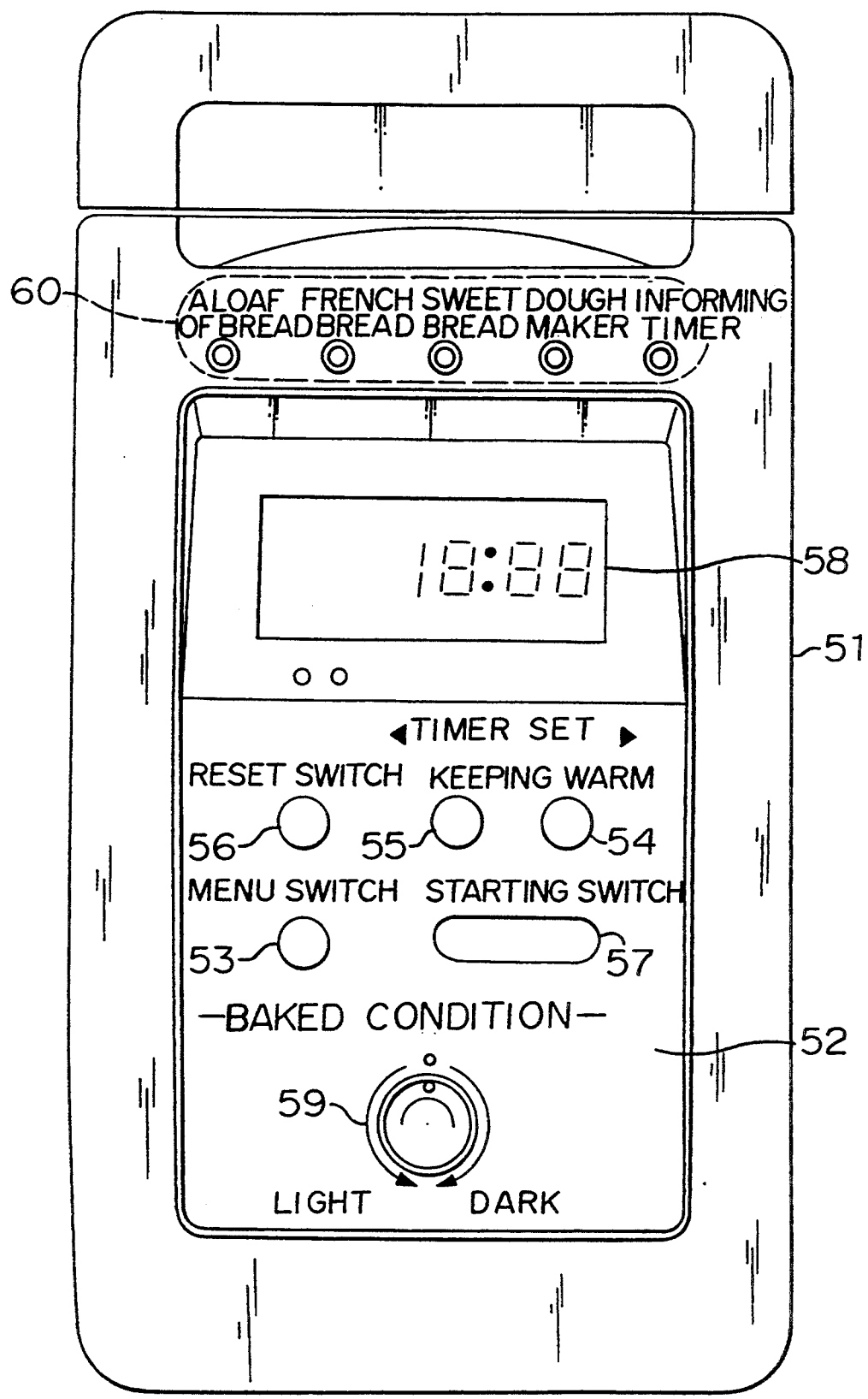
FIG. 13 is a plan view of the operating panel of the baking machine laid open in Utility Model Application No. Heisei 1 (1989)-108232.
Figure 14:
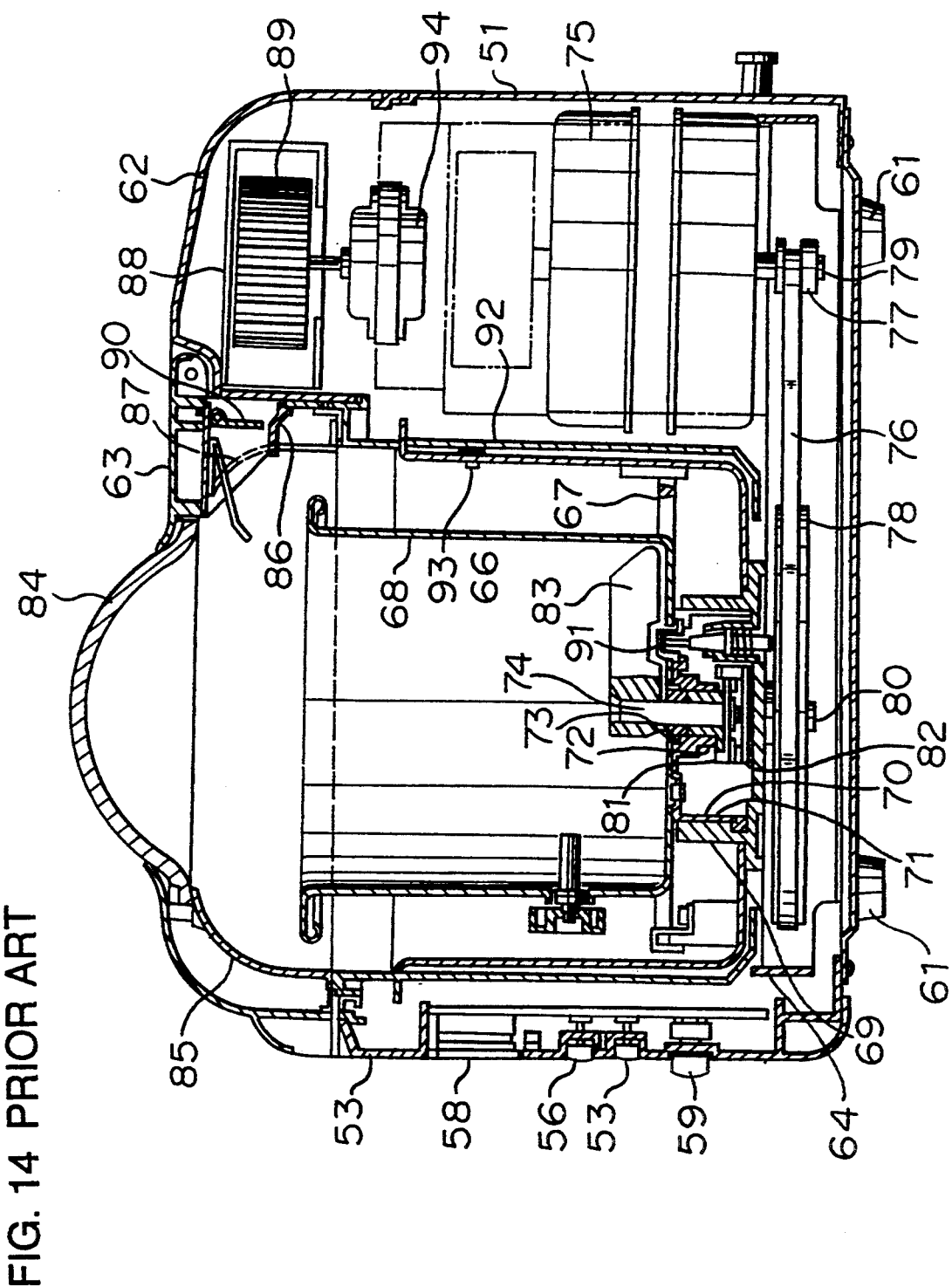
FIG. 14 is a sectional view showing the internal structure of the conventional baking machine.
Figure 15:
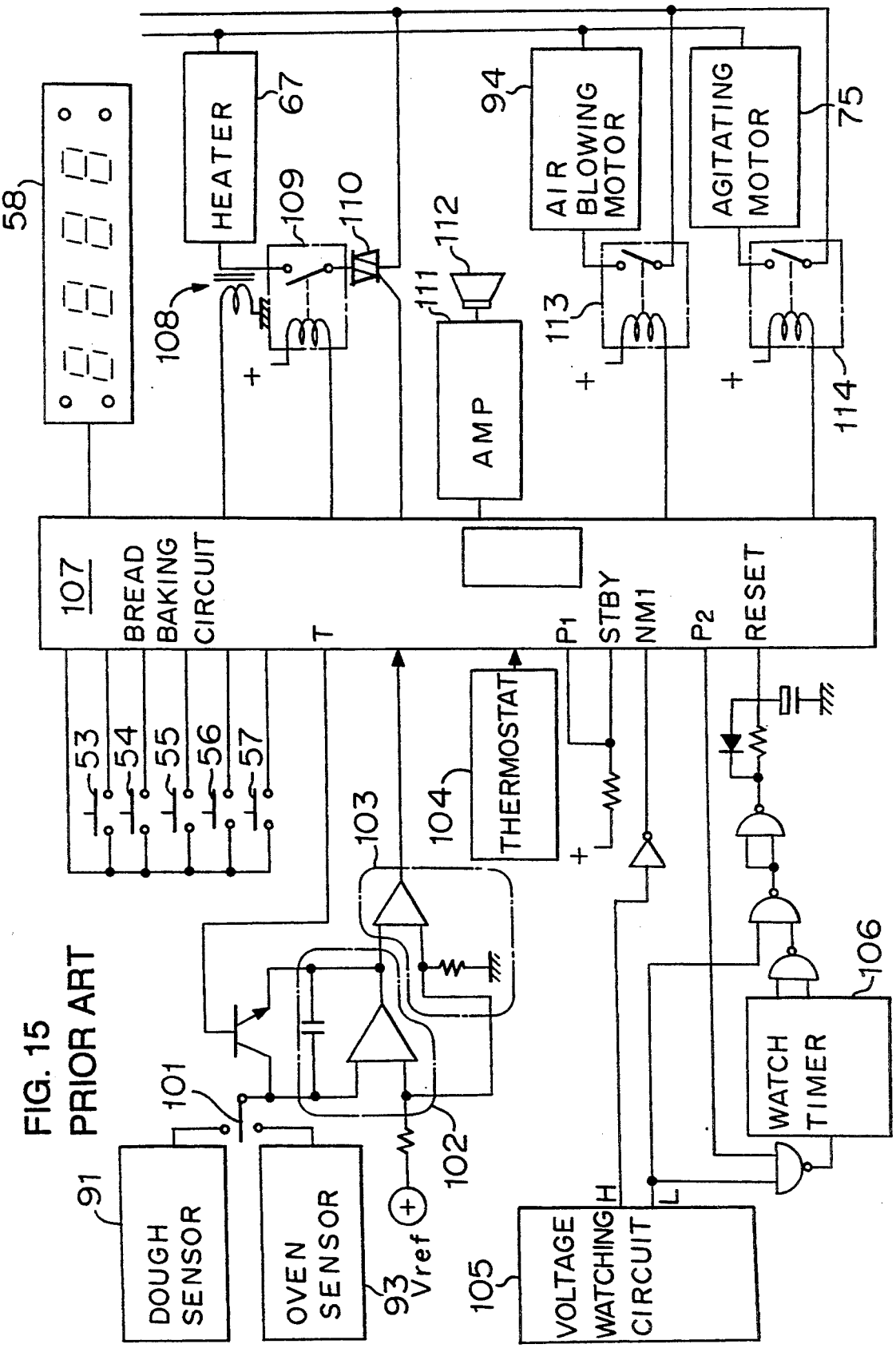
FIG. 15 is a circuit diagram of the controlling circuit of the conventional baking machine.
Figure 16:
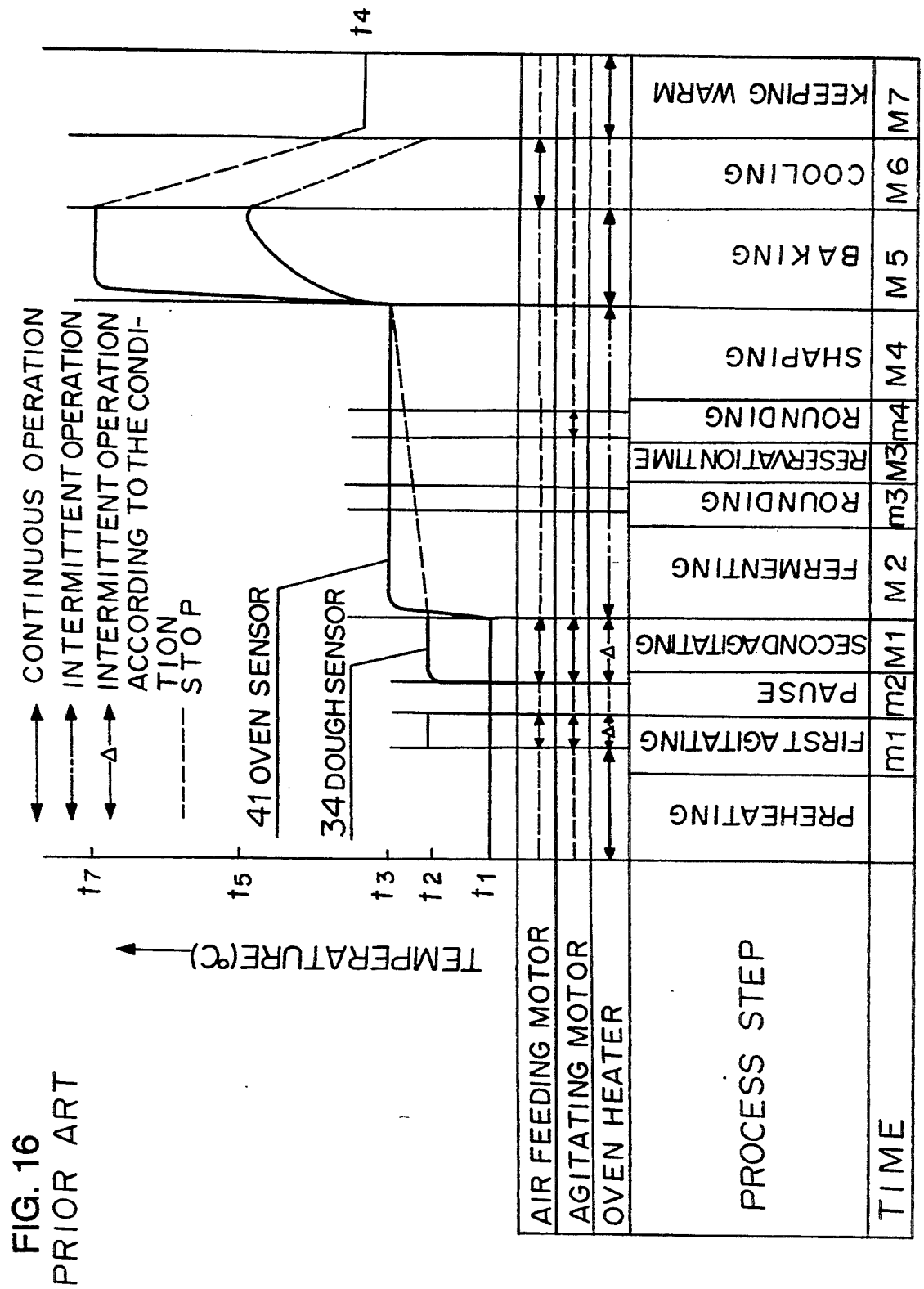
FIG. 16 is a time chart showing the process steps of the conventional baking machine.

In FIG. 1, the same or equivalent parts as the ones shown in FIG. 13 and FIG. 14 are identified with the same reference numerals and explanations referring to those parts is therefore eliminated.

In FIG. 1, a change-over switch 1 for switching the dough sensor 91 to the oven sensor 93, an integrator 2, a comparator circuit 3, a thermostat 4, a voltage-checking circuit 5, a watching timer 6 for watching abrupt disconnections, and a microcomputer 7 are arranged therein. Also, the microcomputer 7 is provided with RAM, ROM 7a, I/O ports and A/D comparator, and in the ROM 7a, a processing program for directing the baking procedure, standard processing time data for each baking step, and a processing time changing program for changing the processing time of each step shown in FIG. 2 are recorded.

Further, a transformer 8 for feeding back heater current in a heat radiating heater 67, a relay circuit 9 for ON/OFF regulation of said heater current in the heater 67, a triac for controlling the heater current in the heater 67, an amplifying circuit 11 for a speaker, a speaker 12 which sounds an alarm, a relay circuit 13 for turning the air-discharging motor 94 on or off, and a relay circuit 14 for turning an agitating motor 75 on or off, are installed on said circuit.

Next described is the operation of changing the processing time of each of the processing steps. The flow chart which explains the procedure for setting or changing the processing times is shown in FIG. 2.

Figure 2:
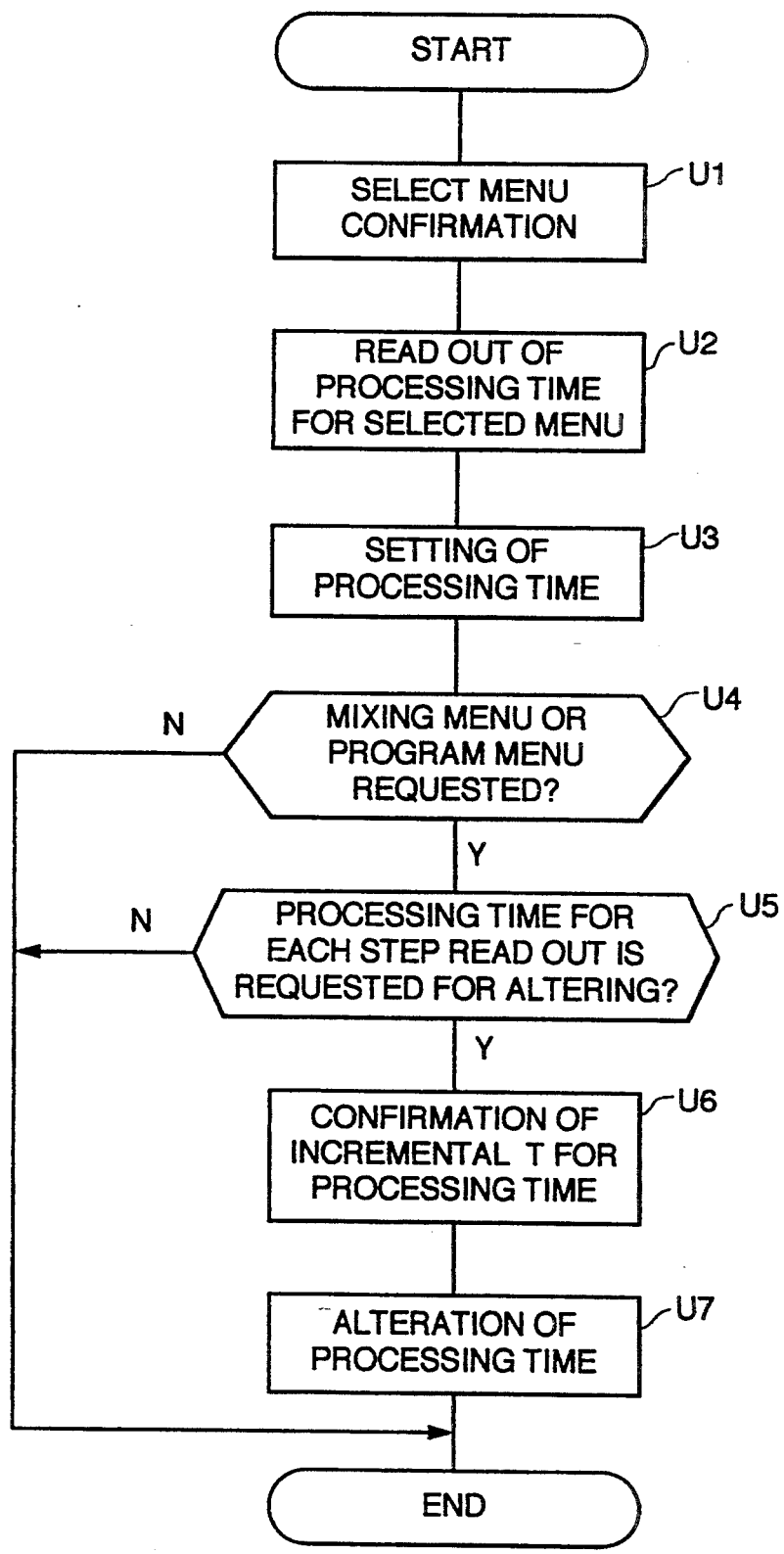
FIG. 2 is a flow chart describing the working action for altering the processing time of the baking machine applying the process controlling device shown in FIG. 1.

In reference to FIG. 2, when a menu is input through a menu switch 53, the selected menu is confirmed in step U1, then the standard processing time for each of the processing steps according to the kind of bread, e.g., a loaf of bread or French bread, is read from the ROM 7a in step U2, and then in step U3, said processing times read out from the ROM 7a are stored in specified registers. The standardized processing times are the standard processing times for each of the processing steps in performing the process program for the bread baking procedure. Step U4 checks whether menu "MIXING" or "PROGRAM" is requested. If they are not requested, the processing time setting is finished, and the baking process according to the present standard processing time is performed. On the other hand, if the "MIXING" or "PROGRAM" menu is selected, step U5 checks whether the standardized processing time for each baking process, read out from the ROM 7a, should be changed or not. If any change is required, the required time increment +T is added to said standard processing time stored in the specified register. Therefore, in step U7, if said incremental time is +T, the processing time of the designated process step is elongated as much as +5, and if said time is −T, the processing time is shortened as much as T.

Furthermore, if said incremental time +T input from the menu switch 53 and reservation switches 54, 55 for setting the baking time equals zero, the processing time remains as it is. As the present processing time is not set at zero, it is possible to prevent the occurrence of the above-mentioned abnormal accidents.

SECOND EMBODIMENT

A bread-baking machine applying the second embodiment according to the present invention is shown in FIG. 3 to FIG. 9.

Figure 3:
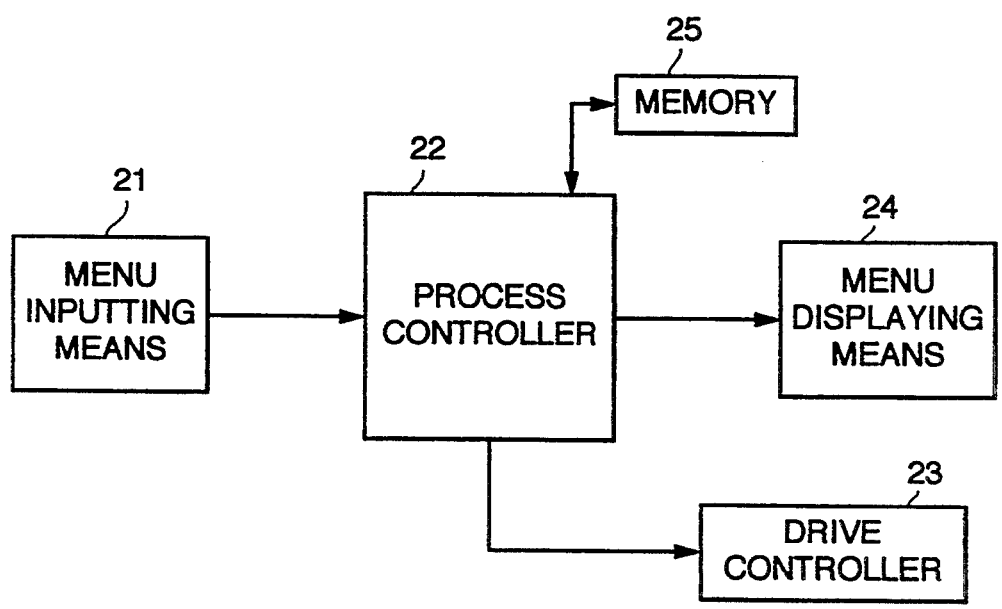
FIG. 3 is a block diagram of the essential portions of the second embodiment of the process-controlling device applied to the baking machine.

The block diagram of this embodiment is shown in FIG. 3. A menu input means 21 includes a standard keyboard for inputting data, and an exclusive keyboard for inputting menu and the like, and generates command data and program data corresponding to the basic operating data in accordance with the input data keyed-in with menu number or other signs, and outputs them to a controller 22.

In practice, the type of bread, e.g., a loaf of bread, French bread, sweet bread and the like is selectively input through said menu inputting means 21 is sent to the controller 22. The controller 22 calls the preset processing time for each of the baking process steps from the format stored in the memory 25 by referring to said information received from the menu inputting means. The format is shown in FIG. 4. Furthermore, said selected type is displayed on a menu display means 24.

The process controller 22 also sends said controlling data towards a drive controller 23 of the baking machine. If menu "MIXING" or "PROGRAM" requiring changing of the processing time is selected by said menu inputting means 21, the controller 22 exchanges only said new processing time input from the menu inputting means 21 with the preset standard processing time, and the drive controller 23 performs each of said controlling data received from the controller 22.

Figure 6:
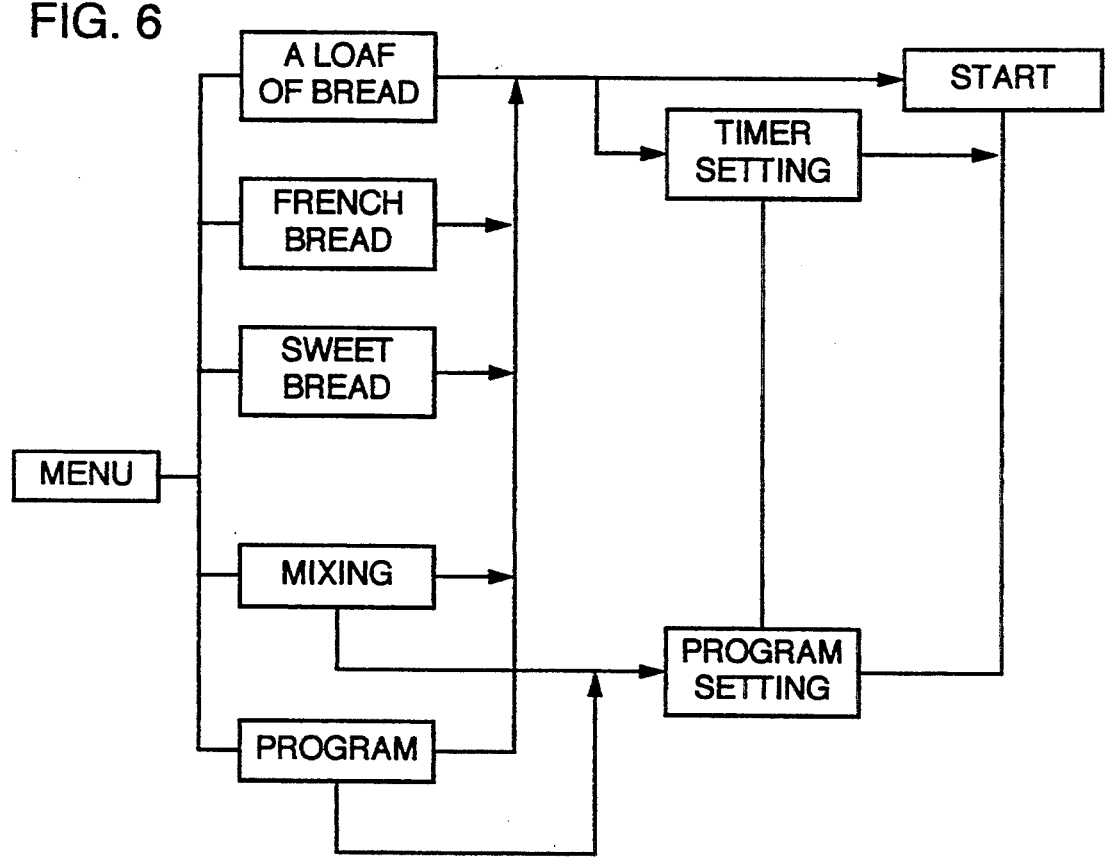
FIG. 6 is a block diagram showing the processing time setting procedure in accordance with the types of bread in the second embodiment shown in FIG. 3.

For example, as shown in FIG. 6, when any one of the menu, e.g., a loaf of bread, French bread, sweet bread, "MIXING" or "PROGRAM" is selected by the menu input means 21, with respect to a primary agitating step, a pause step, a secondary step, a fermenting step, a rounding step, and a shaping step, each preset processing time shown in FIG. 4 is set, and if the "MIXING" or "PROGRAM" is specified, the program-setting is carried by inputting the necessary numerals for each processing step, after which the timer is set, and the ensuing process starts.

Furthermore, after the menu is determined, the controller 22 outputs the drive controlling signals corresponding to the menu content towards said drive controller 23, and each the processing step is successively performed.

For example, if a loaf of bread is selected, although the preset standard processing times are fixed at 15 minutes, 60 minutes, 18 minutes, 20 minutes, 2 seconds and 70 minutes for said primary agitating, pausing, secondary agitating, fermenting, rounding and shaping, respectively, it is possible to have the baking process successively proceed, having each processing time for each of the processing steps set in the range of 0–60 minutes, 0–60 minutes, 0–60 minutes, 0–90 minutes, 0–10 seconds, and 0–90 minutes by selecting the "PROGRAM" menu.

Figure 9:
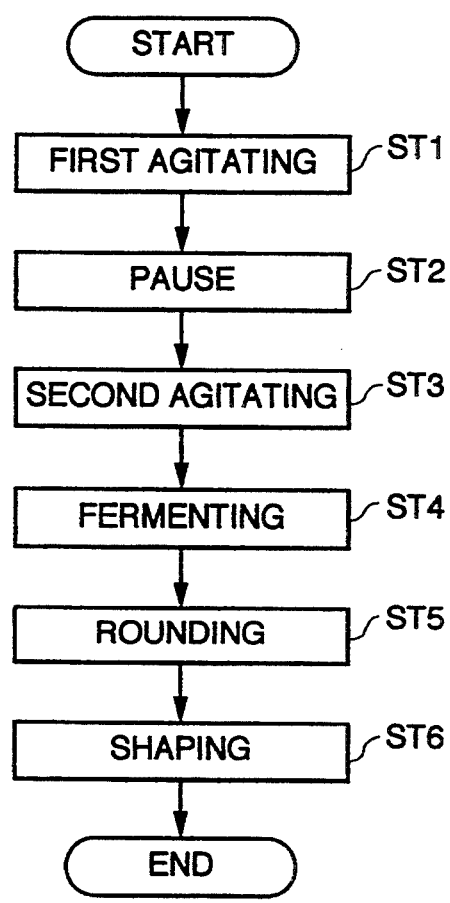
FIG. 9 is a flow chart of the dough agitating step in the present invention and in the conventional prior art.

Also, the above-mentioned bread baking process is carried out according to the flow chart shown in FIG. 9. In step ST1, the dough placed in said baking case 63 is agitated during the first agitating time, then in step ST2, the baking process pauses during preset time, then in step ST3, the secondary agitating step is performed during the preset time. In step ST4, said dough ferments during the preset time, then in step ST5 the dough is rounded in a few seconds, then in step ST6, the forming step is performed during the preset time.

Figure 5:
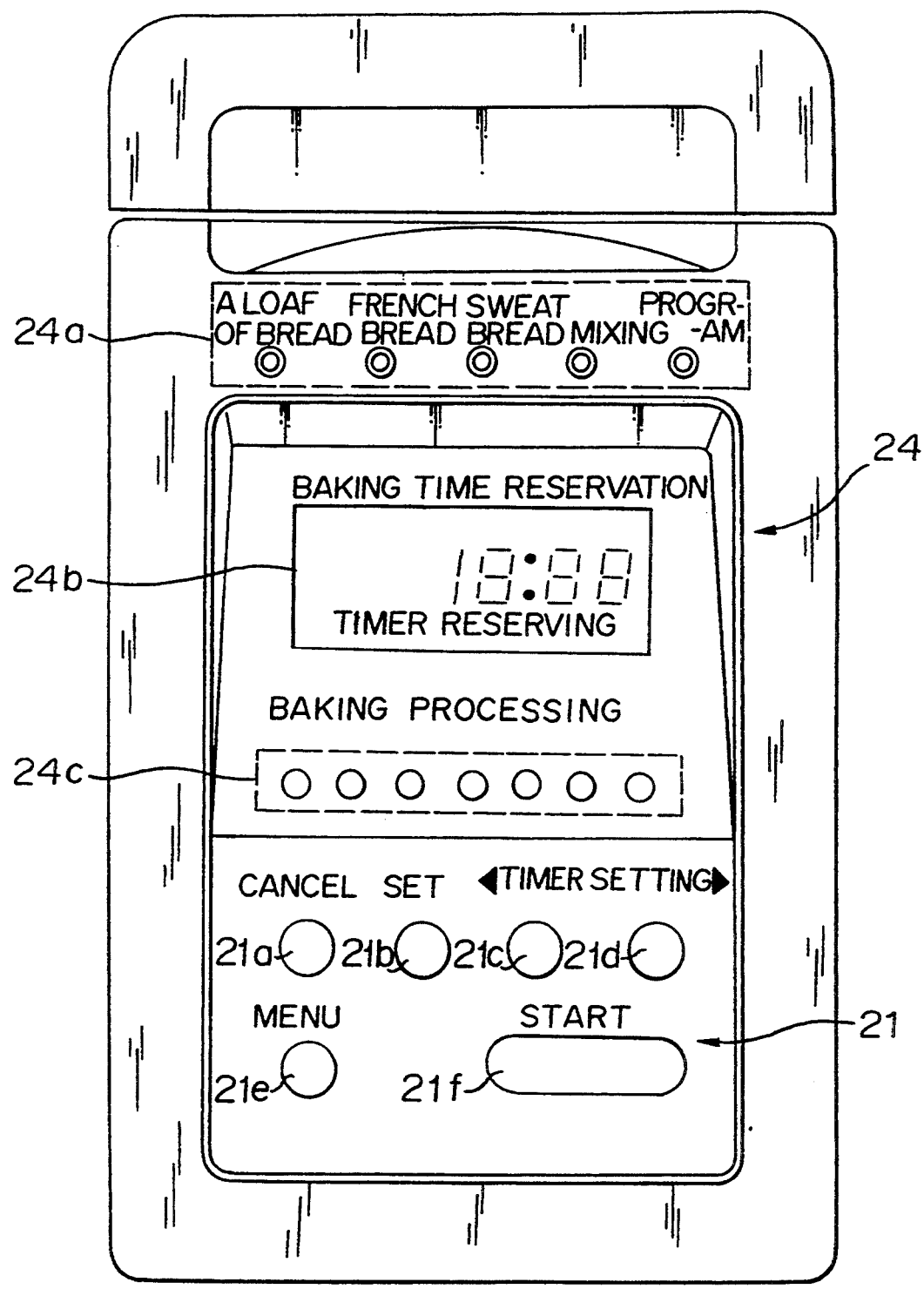
FIG. 5 is a plan view of the controlling panel adopted in the first embodiment of the bread-baking machine.

More clearly, the operating panel of the baking machine is provided with the menu inputting means 21 and menu displaying means 24 is shown in FIG. 5. The menu displaying means 24 includes a menu display 24a for displaying a selected menu by using LED or the like, a graphic displaying system 24b using liquid crystal or the like, a display 24c for indicating the preset processing step by using LED or the like, and the menu input means 21 includes a cancelling button 21a, a setting button 21b, process time setting 21c, 21d for setting plus or minus incremental time against the present standard time, and a starting button 21f for starting the baking process.

Figure 7:
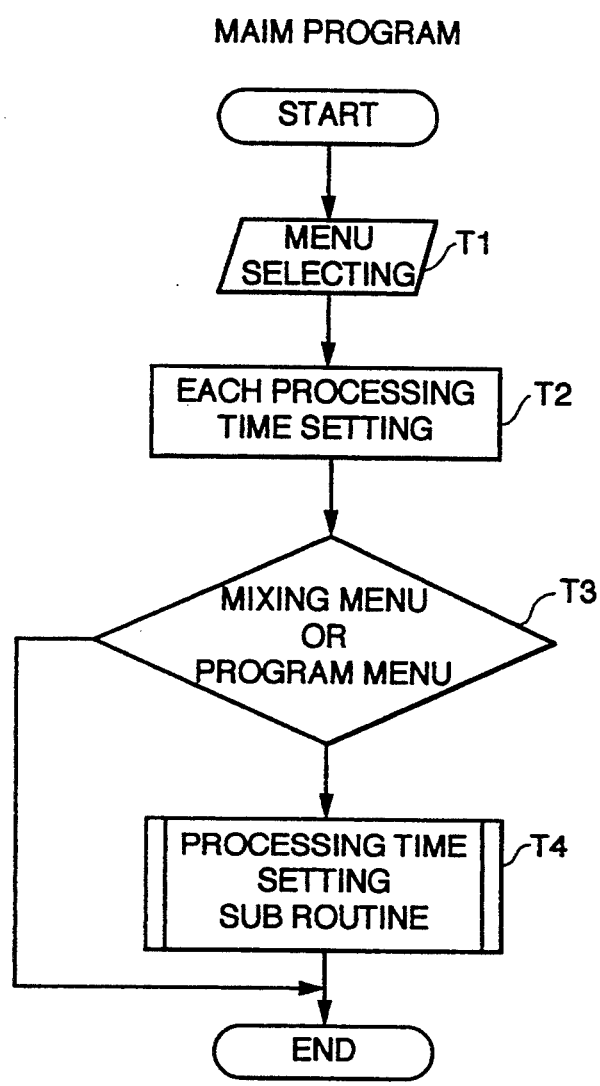
FIG. 7 is a flow chart for setting the processing time in the second embodiment shown in FIG. 3.
Figure 8:
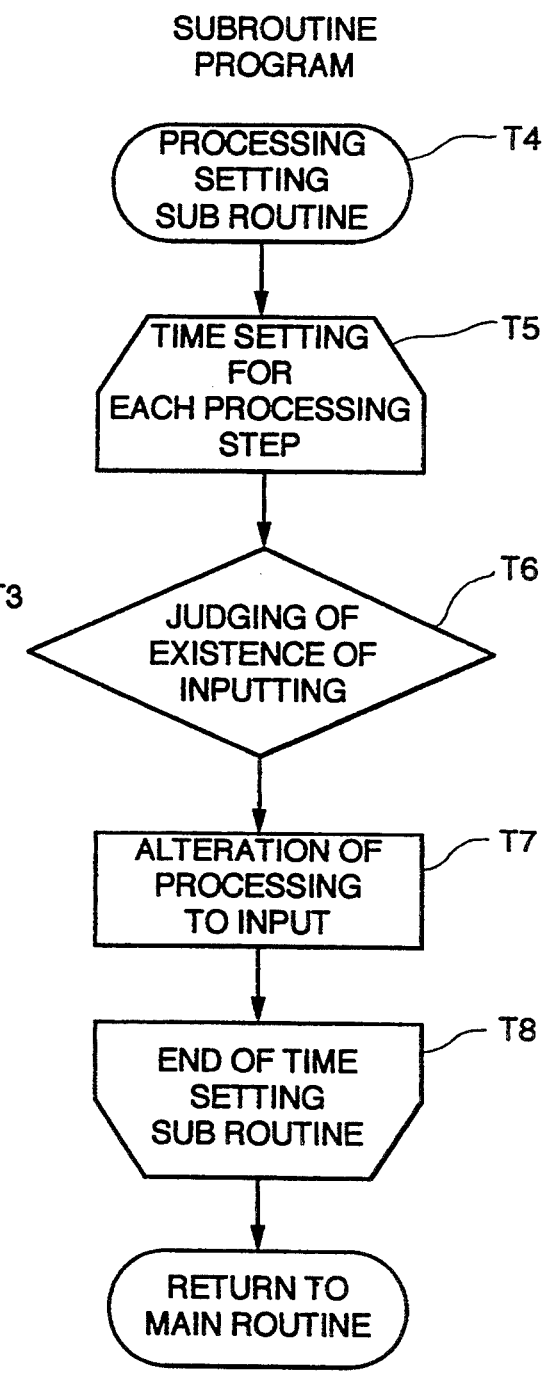
FIG. 8 is a flow chart of the processing time setting subroutine shown in FIG. 7.

The flow chart of the programming process shown in FIG. 6 is also shown in FIG. 7, and FIG. 8 shows the flow chart of the processing time setting subroutine.

In FIG. 7, menu selection is performed by pushing the menu button 21e in step T1. The processing time setting is then performed in step T2. (In this case, even if the "MIXING" menu or "PROGRAM" menu is input, the preset processing times are set.) If the "MIXING" menu or "PROGRAM" menu is input, this selecting program goes to the processing time setting subroutine (step T4); otherwise, the program comes to an end.

In succession to Step T4, each of the processing times comes to be set respectively in the preferred value in the range of 0–60 minutes (in said primary agitating step), 0–60 minutes (in said resting step), 0–60 minutes (in the secondary agitating step), 0–90 minutes (in the fermenting step), 0–10 seconds (in said rounding step) and 0–90 minutes (in the shaping step) in step T5. In this case, only said processing time for the rounding step is required to be input in units of seconds.

The action of increasing or decreasing the values corresponding to said processing times is operated by the processing time setting buttons 21c and 21d, and the values determined by pushing said setting button 21b. If the setting button 21b is pushed without pushing said buttons 21c, 21d, the processing time setting is not performed.

Step T6 determines whether or not the process time setting inputs are present or not. If present, the preset processing time is exchanged with the new processing time in step T7. After repeating this operation, and all processing steps are altered to the new times, this time-selecting program comes to the end. Thereafter, of course timer inputting is available.

As described above, in this second embodiment of the baking machine, each of the baking steps is successively executed according to the revised new processing time in relation to said food selected by the menu input means, the agitating time for the type of dough such as breads, pastas, Chinese and Japanese noodles is arbitrarily set by users, and accordingly it is possible to automatically make many kinds of dough having different qualities, and to obtain a bread-baking machine having vast universality.

THIRD EMBODIMENT

Figure 10:
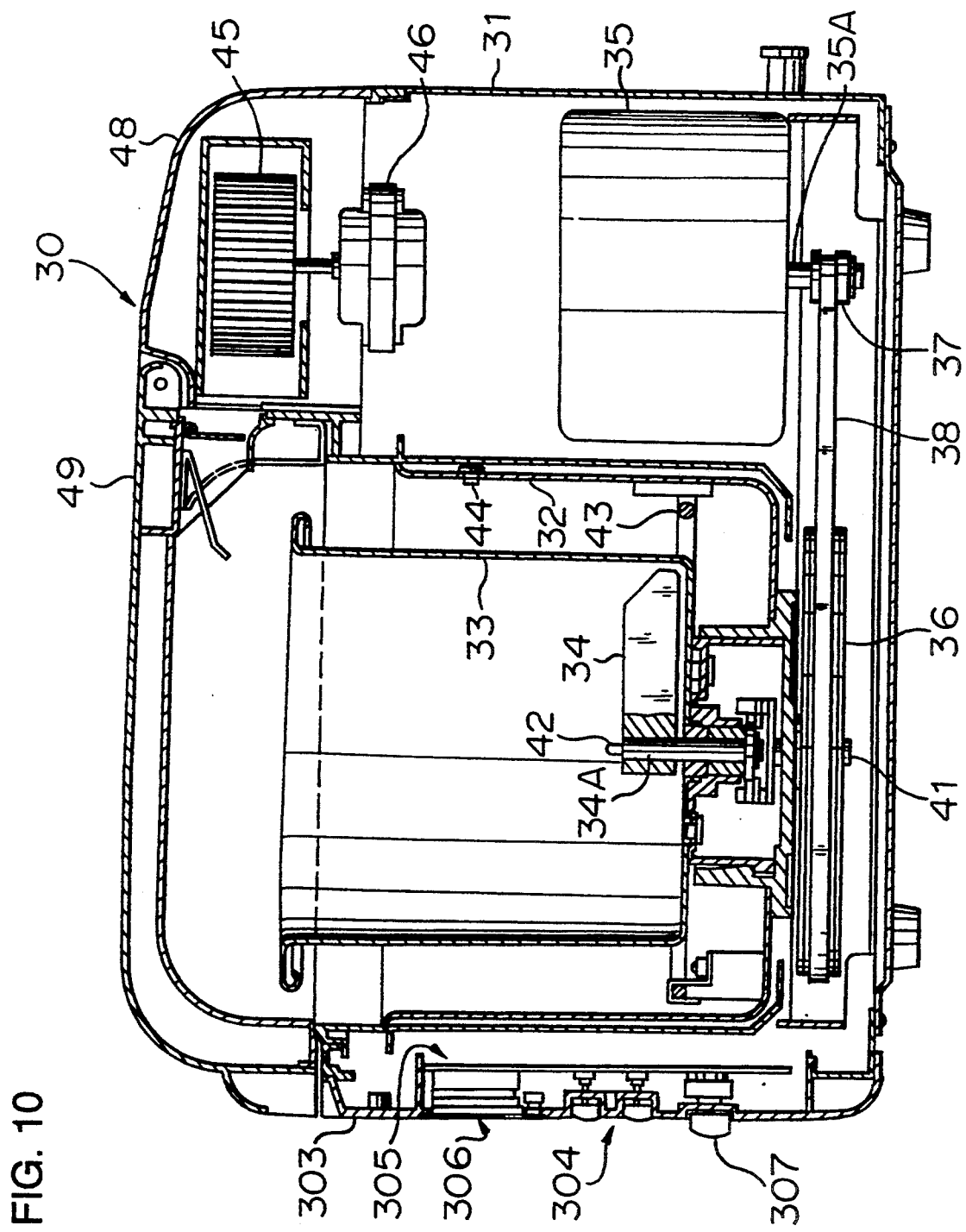
FIG. 10 is a sectional view of the bread-baking machine adopting the third embodiment of the process-controlling device according to the present invention.
Figure 11:
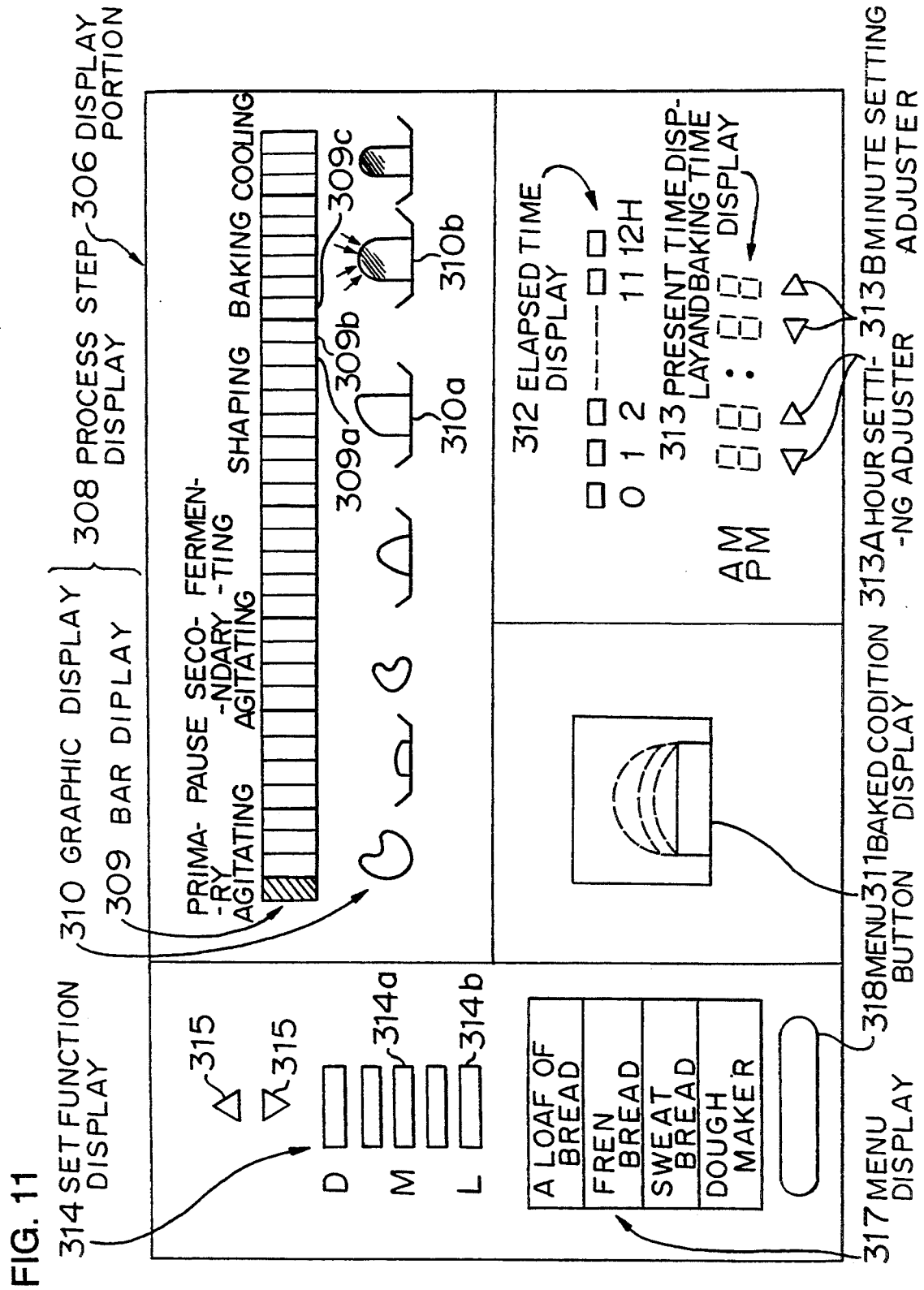
FIG. 11 is a facing view of the displaying portion of the third embodiment shown in FIG. 10.
Figure 12B:
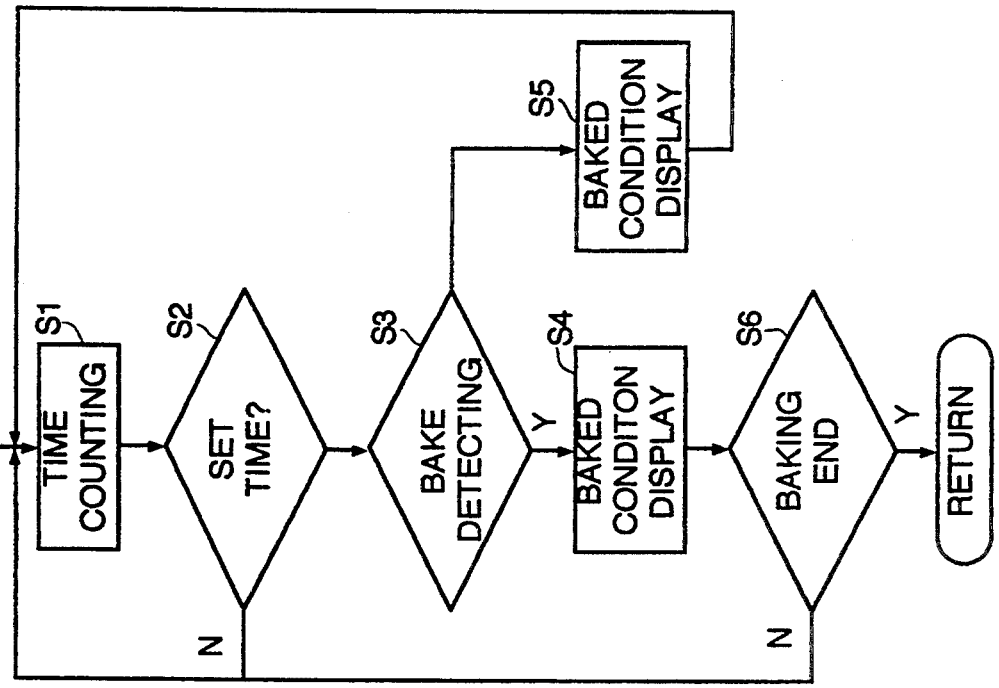
FIG. 12(*a*) is a flow chart showing the overall baking process.
FIG. 12(d) is a flow chart for displaying the elapsed processing time.
Figure 12:
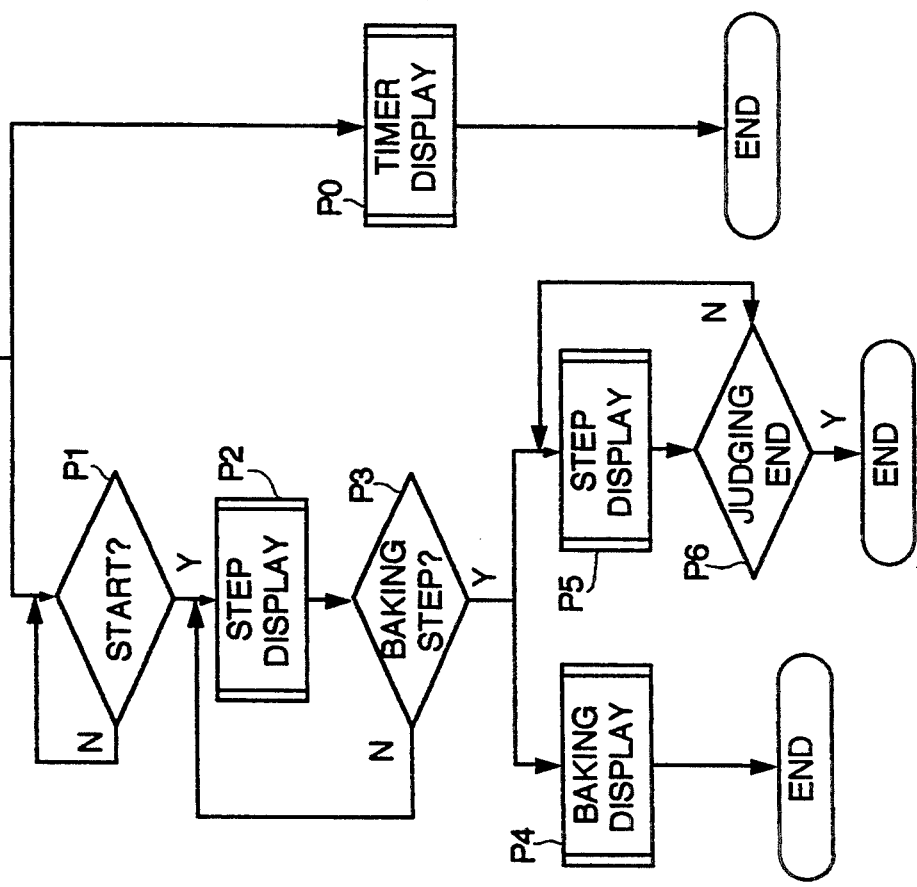
Figure 12:
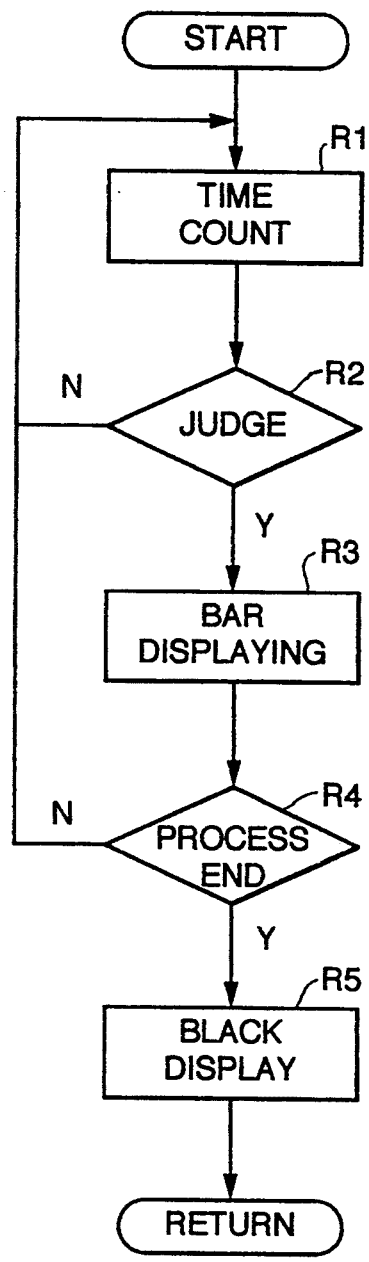
Figure 12:
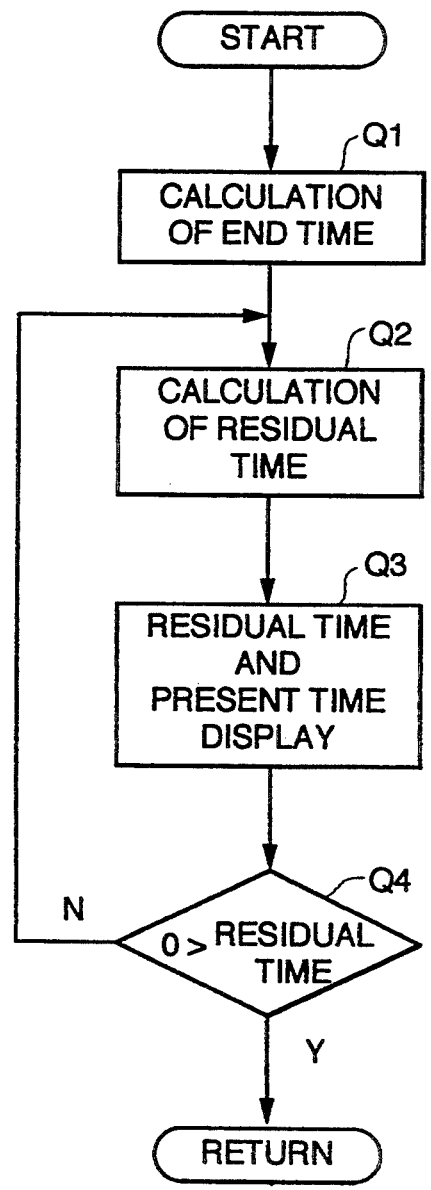

A bread-baking machine applying the third embodiment according to the present invention is shown in FIG. 10 to FIG. 12.

First, the construction of the baking machine is described.

In FIG. 10, the bread baking machine 30 has an inner case 32 in the case main body 31, and a bread-baking case 33 is detachably installed to the inner case 32. Furthermore, an agitating blade 34 having a rectangular-shaped plate and being rotatable around its end portion is mounted on the central bottom portion of said baking case 33. The agitating blade 34 is driven by a motor 35 installed in the case main body 31 through a small pulley 37 connected to the motor shaft 35A, a large pulley 36 connected to a shaft 41 is detachably connected to a rotating shaft 34A driving the agitating blade 34, and an endless belt 38 wound around the pulleys, and agitates the dough thrown into the baking case 33.

In the vicinity of the agitating blade 34, dough sensor 42 such as a thermistor and the like for detecting the temperature of said dough, and the temperature-reading portion of the dough sensor are connected to the controller 305 in the later mentioned operating panel 303. A heater 43 for heating the dough is connected to a power source through the controller 305. The numeral 44 identifies an oven sensor. A cooling fan 45 is installed above said motor 35 in the case main body 31, and the cooling fan is driven by the motor 46 for blowing the cold air against the upper portion of the baked bread and for cooling it through the opening 47 when the baking process enters the cooling step after the baking step. The numeral 48 identifies an upper case, and an upper covering lid 49 is rotatably installed on said case 48 for opening or closing the baking machine. On the front outer surface of the case main body 31, the operating panel 303 is installed.

In the operating panel 303, an operating portion 304 having a push button for setting, operating the process of said bread baking machine 301, a controlling portion 305 for controlling said processing in accordance with the working of the operating portion 304, and a display portion 306 for displaying control signals from the controlling portion 305 and matters operated in said operating portion 304, directly or through the controlling portion 305 are installed therein. The numeral 307 is a start button. A display means includes the display portion 306 and the controlling portion 305.

The controlling portion 305 includes a CPU, ROM, RAM, I/O ports, and AD converter, computing means, a timer and a watch, and connected to sensors such as the dough sensor 42, said oven sensor 44 and the like. The ROM memorizes standardized programs for bread baking, processing times, and other required data.

The CPU exchanges required information with said constructive members and the external sensors, and performs the necessary computations and dealings of the measurements, and outputs processing and display signals.

In accordance with the operations of said operating portion 304 and processing signals form the controlling portion 305, the bread-baking machine 30 successively performs each agitating, fermenting, shaping, baking, and cooling action for the dough throw in the baking case 33.

The display portion 306 includes arbitrarily displaying materials such as lighting tubes, 7 bit numeric displaying tube and the like, and displays baking processes, processing conditions, and set conditions of miscellaneous functions shown in FIG. 11.

Namely in FIG. 11, one embodiment of the displaying portion 306 is shown.

In FIG. 8, a process display 308 includes a process progress display 309 and a process condition display 110. The process progress display 309 successively displays each step of the baking process such as first agitating step, resting step, secondary agitating step, fermenting step, shaping step, baking step, cooling step and the like, in successively moving lighting bar signs (lighting condition of the signs is shown in shaded lines in FIG. 11). Also, the process condition display 110 is located under said display 309 and displays the processing steps with the graphics showing the present baking condition.

Further, in the display portion 306, a baking condition display 311 is installed. The display 311 is constructed to display the expanded condition of the baked bread inflated over the baking case 33 with the visual lighted figures divided into a plurality of steps (in this case, divided into three steps). The display 311 may be constructed so as to continuously display the expanded condition of the baking bread.

An elapsed time display 312 displays elapsed times with the remainder of the processing times lightened by a series of bar signs.

A present time display 313 displays bread baking time in addition to displaying the present time. The display 313 separately displays the set hours and the set minutes, and the set hours and set minutes are adjustably set by pushing arrow-shaped buttons 313A, 313B installed under the display 313. Namely, by pushing said left-hand buttons, the set hours or minutes are increased, and by pushing said right-hand buttons, the set hours or minutes are decreased. The display 313 is constructed so as to display the remaining time until baking is completed after the baking process starts.

Further in FIG. 11, a set functions display 314 is installed for displaying the baking conditions such as light (L), medium (M), and dark (D) determined by the user with flashing light. The display 314 is set at the user's preferred condition by pushing a pair of triangular switches 315, 315 installed above the display 314.

Also, a menu display 317 is constructed so as to emit light for displaying the kind of baking bread such as bread loaves, French bread, sweet breads and dough making. Under the display 317, a menu button 318 for controlling the display 317 is installed, and according to the pushing of the button, the lighted position of the display 317 is successively changed.

Next, in reference to the construction of the third embodiment, the operation thereof is described as follows.

In this embodiment, at first by inputting the preferred baking condition in said button 315 and determining the baking time, these input conditions are displayed on the display 314. After said dough is placed in the baking case 33, by pressing a starting switch 307 (shown in FIG. 10) the controller 305 successively performs primary agitating, resting, secondary agitating, fermenting and shaping in accordance with the preset programming, then bakes by driving the heater 43 connected to the power source, and finally cools by introducing cool air through the opening 47. The above-mentioned baking processes are successively displayed on the process step display 308 with flashing light, and the elapsed processing time is displayed on the elapsed time display 312.

The above-mentioned baking process performed by the controller 305 is described in detail with reference to the flow charts shown in FIG. 12(a), (b), (c) and (d) as follows. In FIG. 12(b), 12(c), and 12(d), each flow of timing display process step display and baking display are shown. The bread-baking process is started by selecting the type of bread to be baked by said menu button 318, and by setting the baking time by the time adjuster 313A and 313B.

In FIG. 12(a), when said dough is inserted in the baking case 33, said baking condition is set in the display 314 (for example, in M display 314a) through set buttons 315, 315, and the starting button 307 is pushed, in accordance with the starting of the elapsed time display 312 in step P0 (shown in FIG. 12(d)), in step P1, the start of the baking process is determined. If it is not started, returns to the step P1, but if it is started, the process step display 308 starts in step P2. Step P3 determines whether the baking process is in the baking step. If it is, the baking condition display 311 starts in step P4, and in step P5 the process step display 308 continues to display, while step P6 determines whether the baking process has ended. If it has not, it returns to step P5 and if it has, the baking process is ended, and the entire bread baking process is completed.

Next, the elapsed time display 312 flow chart shown in FIG. 12(d) is described. When the starting button 307 is pushed on, the display 312 starts to display, and in step Q1, the total time required for performing the total baking process is computed, and in step Q2, the remaining times are computed, and in step Q3, said remaining times are displayed on the display 312. Further, step Q4 determines whether the remaining times are less than zero, and if they are not, returns to step Q2 for continuing the processing, and if they are, display a zero sign and ends. It may also be possible to continuously display the present time.

Next, the starting of the process step display 308 flow chart shown in FIG. 12(c) is described. When the display 308 starts, in step R1, the timer installed in the controller 305 starts to count times. Step R2 determines whether the counted time reaches the preset processing time stored in the processing program, and if it does not, returns to step R1, and if it does, in step R3 the bar display 309 advances its display only one step towards the right direction (for example, referring to the bar display 309, bar display 309a is advanced to bar display 309b towards the right direction.) Step R4 then determines whether the process is ended, and if it has not, returns to step R1. If it has, in step R5 the graphic sign displayed on the graphic display 310 is advanced towards the right direction. For example, when the shaping step is determined to be completed, the graphic display 310a is advanced to the graphic display 310b showing the baking step.

Next, the baking display flow chart shown in FIG. 12(b) is described. When said baking display starts, in step S1, the timer installed in the controller 305 starts to count the baking time, and said bar display 309b in the bar display 309 is advanced to the bar display 309c. Then step S2 determines whether said counted time has reached the preset baking time, and if it has not, returns to step S1 and continues the baking process. If the time has been reached, step S3 then determines whether bread is already baked, and if it is, then in step S4 the baking condition 314b corresponding to the preselected baking time is displayed on the display 314. Then step S6 determines whether said baking is finished. If it is, the baking step is stopped and the cooling step is started, and the entire baking process is completed after the specified cooling time. In step S3, if the bread is not finished baking, it returns to the step 1, after displaying the baking condition in step S5.

Also, as there is the bread-baking machine having no the cooling step and said baked bread is removed while hot, it is of course possible to apply this invention against such a machine, and there is no need to add more description.

As mentioned above in detail, in the embodiment according to the present invention, because the process step display 308 (composed with a bar display 309 and a graphic display 310), the elapsed time display 312, and a baking condition display 311 are displayed according to the process progression and related working conditions, the operator is able to observe easily the conditions of the baking process such as the working condition in each of the processing steps and the set conditions thereof, and to carry out the baking process as planned, and furthermore to use the baking machine with ease.

In said above-mentioned embodiment, although the process step display 308 (309 and 310), the baking condition display 311, said elapsed time display 312 and the set conditions display 314 are provided in the baking machine, it is possible to provide any one of the displays, and furthermore it is possible to properly change the display methods.

What is claimed is:

1. A process time changeable device for an automatic baking machine, in which said automatic baking machine is provided with a menu input means for selecting a desired bread out of a plurality of breads, a memory means in which a standard time for each baking process step is input, and a control means which operates each baking process step in series for a predetermined period, which comprises; said automatic baking machine further provided within a processing time input means to which a time difference between the preset standard time and a newly set time for any baking process step is input; a processing time changing means which increases or decreases the time for the standard process step by said time difference, and an entire process resetting means which re-sets entire process steps in accordance with the time change by the process time changing means.

2. A process time changeable device for an automatic baking machine as claimed in claim 1, wherein when zero (0) is input for said time difference, the process step proceeds in accordance with the preset standard time.

3. A process time changeable device for an automatic baking machine as claimed in claim 1, wherein said automatic baking machine is further provided with at least one display means selected from the group consisting of a process step display which shows the current step in the course of automatic baking processes, an elapsed time display which shows an elapsed time of the process from the starting time and remaining time to the completion of the entire process, and a baking conditions display which indicates a bread to be baked light, medium or dark.

* * * * *